D. H. WILSON.
APPARATUS FOR CHARGING STORAGE BATTERIES.
APPLICATION FILED NOV. 21, 1911.
1,126,670.
Patented Jan. 26, 1915.
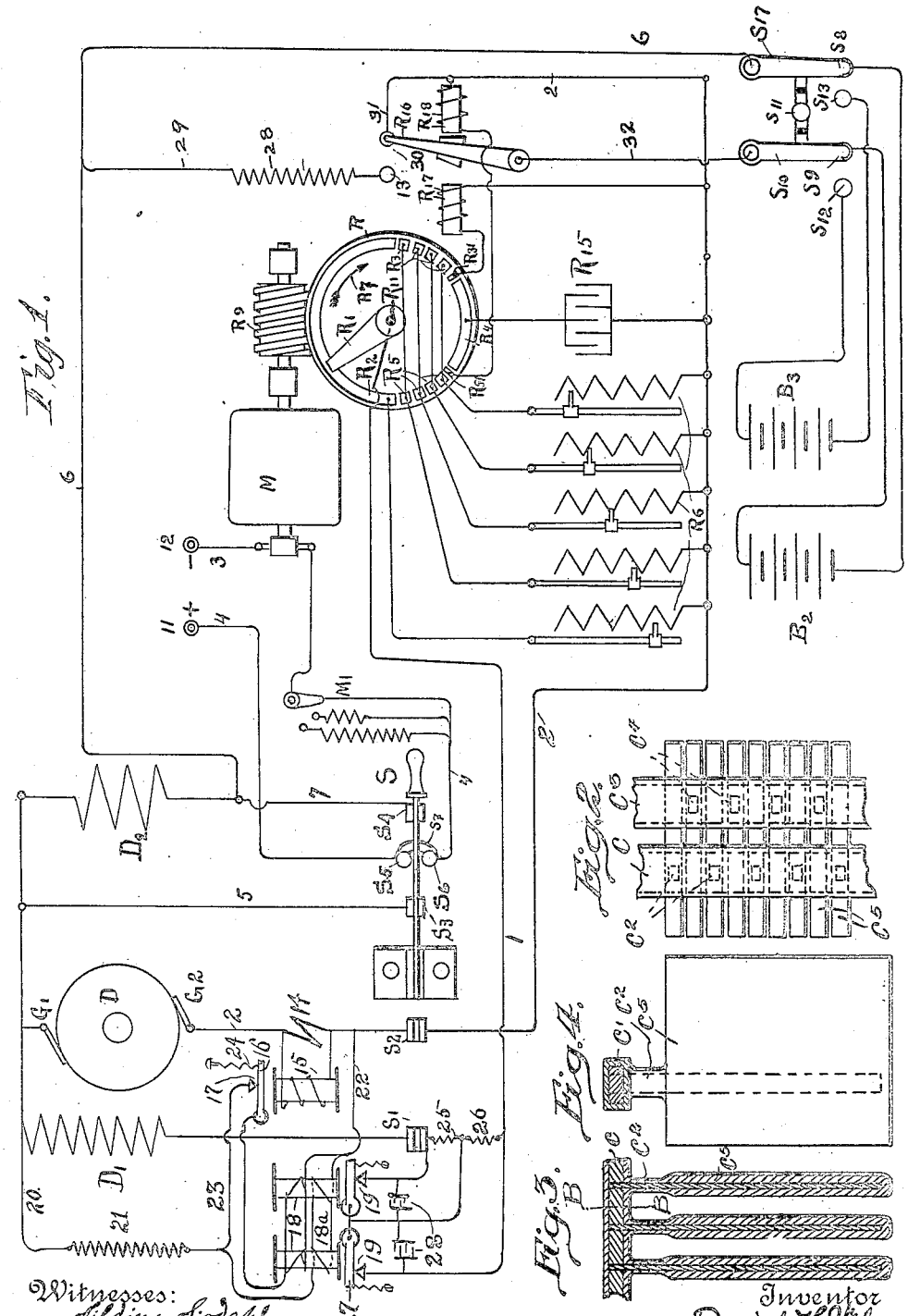

UNITED STATES PATENT OFFICE.

DAVID H. WILSON, OF RIDGEWOOD, NEW JERSEY, ASSIGNOR TO WILSON STORAGE BATTERY COMPANY, OF NEW YORK, N. Y., A CORPORATION OF NEW YORK.

APPARATUS FOR CHARGING STORAGE BATTERIES.

1,126,670.      Specification of Letters Patent.      Patented Jan. 26, 1915.

Application filed November 21, 1911. Serial No. 661,639.

*To all whom it may concern:*

Be it known that I, DAVID H. WILSON, citizen of the United States, and resident of Ridgewood, in the county of Bergen and State of New Jersey, have invented certain new and useful Improvements in Apparatus for Charging Storage Batteries, of which the following is a specification.

My invention consists of apparatus for charging storage batteries which has many marked advantages over the systems now known.

One of the objects of my invention is to greatly reduce the time required to store electrical energy in a storage battery.

In accomplishing this result I charge the battery with a heavy amperage of current and then reduce it to a reversal, thereby creating a period such as will dissipate the resistance or obstacles to charging created by the heavy charge so as to permit the heavy charge to have an efficient effect upon said plates without undue dissipation of energy in the form of heat, and then charge with the heavy amperage again.

The resistance or obstacles to charging at high current rate usually consist in gases generated within the battery by the heavy charging current which tend to insulate the said solution from the battery plates; or which tend to prevent the passage of current from one to the other.

In practice I employ a current for charging the battery of such large amperage as would, other conditions being equal, injure or destroy battery plates not provided with low resistance leading in conductors and then reduce the amperage to about .01 amperes reversed current per square inch of plate surface so as to allow gases to become dissipated or escape from the corrugations of the plate.

Another object of my invention is to evenly distribute the charge of current over the plates and corrugations and extend it from the outer portions of the corrugations to the innermost corners.

Another object of my invention is to cause the charge to penetrate into the plates to a considerable depth and to penetrate more or less evenly over the whole corrugated surfaces of the plates, thus preventing shedding of the plates. In some batteries the active material is in the form of thin ribs. In such batteries, when charged with a low charging current, the charge gathers upon the outer edges of the ribs, and their inner edges, where they are connected to the lead or other stiffer portions of the plate, sometimes break away, causing the active material to scale off, or shed.

My heavy charging current, by penetrating to the innermost recesses between the ribs, more firmly uniting them to the stiffer portions of the plate, prevents the scaling or shedding of the ribs.

When a small current is used for charging battery plates the charge takes effect upon the outer edges of the ribs to far greater extent than upon the innermost recesses between them. As the edges of the ribs become enlarged they close up against each other and, if the charge is carried far enough, exert lateral pressure against each other with the result that some of the ribs are broken or torn off from the plates. The heavy charge on the contrary is distributed evenly over the ribs, the innermost recesses receiving practically as heavy a charge as the outer edges and the ribs are built up uniformly. The edges are not enlarged at the expense of the bases of the ribs. In other words the ribs are firmly united to the plates at all times and are not broken away.

Another object of my invention is to distribute the current evenly through the plates in such a way as to prevent their buckling. This is assisted by running an electrical distributor of high conductivity and considerable surface area into the interior of the plates in such a way as to enlarge the area of the contact between each distributer and its plate. This enlarged area of contact and the proper location of the distributers also prevent heating. The area of contact between the distributers and plates is proportioned to the active area of the plates to insure there results.

Another object of my invention is to time the periodical heavy charges of current so as to insure the maximum charging effect and then when the creation of gases interferes with the efficient charging, to again establish efficient charging conditions by the methods mentioned above. When the gases are dissipated sufficiently to permit another efficient charging the amperage is preferably again increased up to the maximum amount which my battery construction makes possible and convenient.

Another object of my invention is to graduate the changes of current from the high amperage to the conditions which dissipate the obstacles to efficient charging in such a way as not to interfere with the general working of the circuit and its efficiency, and to prevent any reversal of the field coils of the charging machine, or short circuiting of the battery through the charging machine.

The preferred method is to vary the stages between the large amperage and the reversed amperage in such a way that the current is "stepped down." Again, when the current is to be restored to the full amperage it is "stepped up" through resistance, either internal or external, or any other suitable means; that is, the amperage is increased by shifting into circuit lower resistance circuits one by one which has the effect of increasing the current step by step.

Another object of my invention is to time the intermittent charging current, or the periodicity of its waves to get the quickest and best results. This is preferably done automatically by means of a motor of some kind, the speed of which is determined and which cuts in and cuts out resistances automatically in the shunt field circuit and the frequency and form of the charging waves is predetermined and fixed to secure efficient results. The motor also manipulates the fields and external circuit by means of the automatic switch.

A further object is to vary the charge from a high amperage to the reversal without disrupting or injuring the windings of the charging machine or other windings in the circuits.

A further object is to make such variations periodically with a predetermined speed.

A further object of my invention is to arrange the circuits so that they may be used for charging such a battery, and at any time be so switched as to charge an ordinary battery in the ordinary way by leaving the field coils in such a condition of activity as to enable them to be used with such ordinary storage batteries.

In the drawings: Figure 1 shows my charging apparatus switched to such a condition that it will charge my special battery as aforesaid. Fig. 2 is a top view of the connections of my battery plates. Fig. 3 is a sectional elevation of one of my series of battery plates with the electrical connections thereto. Fig. 4 is a side elevation of one of the said plates.

In Fig. 1 my apparatus is shown in condition to charge my special battery $B^2$, which is the battery shown in some of the other figures of the drawings. When the switch S is thrown to the position shown in the full lines in Fig. 1 it accomplishes four functions. The charging machine D is connected over the following circuits: Brush $G^1$, shunt field coil $D^1$, conductor 1, brush $R^1$, of the automatic resistance varying device R, contact plate $R^2$ of the said automatic resistance varying device R over one of the resistance coils $R^6$, connected between the said plate $R^2$ and conductor 2, thence by way of conductor 2 to the brush $G^2$. At the same time a multiple circuit is established from the brush $G^1$ of charging machine D by way of conductor 5, contact point $S^3$, contact point $S^4$, conductor 6, contact lever $S^7$, contact point $S^8$, battery $B^2$, contact point $S^9$, switch lever $S^{10}$, conductor 32, switch lever $R^{16}$, conductors 17 and 2, brush $G^2$, to the charging machine D.

The series coil $D^2$ is also short circuited by conductors 5 and 7 running to the contact points $S^3$ and $S^4$ respectively, which are united together by the switch lever S. The throw of the switch lever S also connects together the contact points $S^5$ and $S^6$ by the bridge contact $S^{17}$, which is mounted upon but insulated from the lever S. The circuit thus established is traced from the terminal 11 over the conductor 4, the switch contact points $S^5$ and $S^6$, rheostat $M^1$, armature of the motor M, to the terminal 12.

The terminals 11 and 12 are connected to any suitable source of current to run the motor M. This is preferably run at a steady speed. The motor M turns the worm $R^9$ which operates the brush $R^1$ mounted upon the shaft $R^{11}$ carrying the brush $R^1$ as shown in Fig. 2. The brush $R^1$ travels in the direction of the arrow $R^7$ and may rest upon the contact plate $R^2$, for the purpose of delivering a heavy amperage to the battery $B^2$. As the brush $R^1$ travels over contact points $R^3$, higher resistances $R^6$ are introduced in the shunt field circuit, thereby reducing the amperage delivered to the battery. When contact $R^{31}$ is reached, the coil $R^{17}$ is energized. This opens the circuit between switch lever $R^{16}$ and contact 30, thereby throwing the resistance 28 across the terminals of the battery $B^2$ and reversing the battery current, for the purpose of dissipating the obstacles to charging created by the heavy amperage. The brush $R^1$ engages contact $R^4$ before leaving $R^{31}$, and when the brush $R^1$ leaves the contact $R^{31}$ the condenser $R^{15}$ connected to $R^4$ protects the field coils and other windings in the circuit from damage. The brush $R^1$ then engages contact $R^{51}$, energizing coil $R^{18}$ which restores the switch lever $R^{16}$ to contact 30, reintroducing the battery $B^2$ into the charging circuit. The brush $R^1$ travels from the contact plate $R^{51}$ over the contact points $R^5$ connected to varied resistance coils $R^6$ by means of which the resistance of the circuit containing the shunt field coil $D^1$ is lowered step by step. The brush then passes to plate $R^2$ which introduces the lowest resistance coil $R^6$, in the circuit of the shunt field coil $D^1$. The coils $R^6$ having varying degrees of resistance vary the resistance or ampere field turns of the shunt field, and hence vary or control the output of the charging machine.

It will be seen that by means of this automatic resistance varying device the current flow in the shunt filed coil $D^1$ is varied and steadily increased in amount as the brush $R^1$ passes from the contact plate $R^4$ to the contact plate $R^2$ and steadily increases the amperage delivery of the charging machine D. As the amperage increases and flows through the battery $B^2$ the battery is charged with a constantly increasing current. This current may be increased until the maximum charge which the battery $B^2$ is capable of receiving is delivered from the charging machine. With the particular batteries shown in Figs. 2 to 4 a current of such heavy amperage as would, other conditions being equal, injure or destroy plates not provided with the low resistance inserts may be delivered to the battery with efficient results. This amount may vary in accordance with the circumstances and conditions of use, the kind of battery to be charged, and the speed at which it is desired to be charged. When the condenser $R^{15}$ is introduced into the circuit in series with the shunt field coil, it substantially shuts off the current of the field coil and at the same time protects it and the other windings of the apparatus from injury. This causes a cessation of the current delivery from the charging machine so that no current is passed into the battery $B^2$. At the same time the local circuit from the battery through the high resistance coil 28 permits a reversal of the current, or a discharge from the battery which dissipates the obstacles to charging created by the heavy charge with surprising rapidity. Any suitable provision to take care of the current from the charging machine may be substituted in place of the broken circuit, when the battery is disconnected from the charging circuit. The brush $R^1$ again passes over the contacts as hereinbefore set forth, repeating the operation preferably periodically, intermittently and with predetermined periodicity.

The periodicity may be varied at will by means of the rheostat $M^1$, by means of which the speed of the motor M may be changed so that the automatic resistance varying device R is timed to give the best results in connection with the particular sizes and designs of the batteries to be charged. When charging one thousand ampere hour batteries having twenty-nine plates with distributers having a cross sectional area of one-eighth by one-half inches.

I prefer to time this automatic resistance varying device so that it makes approximately 16 to 17 revolutions an hour. I find that it may remain upon the contact $R^2$ for about 170 seconds. The current is then "stepped down" in probably 10 seconds to the reversal through the contact $R^{31}$. The brush $R^1$ then rests upon the contact $R^4$ perhaps nearly 20 to 30 seconds and then the circuit is rapidly "stepped up" so that larger and larger amounts flow through the battery as the brush $R^1$ passes over the contacts $R^5$ and reaches the contact $R^2$. These periods of time preferably vary with various conditions so as to give the most efficient results.

When it is desired to convert the charging machine so that it may be used in connection with ordinary batteries of low charging capacity the lever S is thrown over to the contact points $S^1$ and $S^2$, thereby leaving the shunt field coil $D^1$ on a closed shunt circuit around the armature of the charging machine D and the series field coil $D^2$ in the external circuit, so that the charging machine may be used as one having a compound winding suitable for ordinary charging work, where it is used to charge batteries in multiple.

The short circuit around the series field coil $D^2$ is at the same time opened between the contact points $S^3$ and $S^4$ of the switch. The compound switch lever $S^{11}$ is then thrown over so that the switch lever $S^{10}$ engages the contact point $S^{12}$ and the switch lever $S^7$ engages the contact point $S^{13}$, thereby introducing the battery of the ordinary type $B^3$ into the circuit of the dynamo. The current is then delivered from the charging machine from the brush $G^1$ through the series field coil $D^2$, conductor 6, switch lever $S^7$, contact point $S^{13}$, battery $B^3$, contact point $S^{12}$, switch lever $S^{10}$, and conductor 18, switch lever $R^{16}$, and conductor 2 back to the brush $G^2$.

Figs. 3 and 4 show one set of my plates having the bus bars $C^1$ of copper or of other metal of low resistance, electrically united to the distributers $C^2$ which extend into the interior of the plates $C^5$. These copper conductors are preferably covered with lead of a non-porous nature applied in hot or plastic or liquid state by hydraulic or other heavy pressure between dies, and thereby protected from the acids of the battery.

In Fig. 4 is shown a side elevation of one of the plates $C^5$. The distributer $C^2$ is shown passing through the plate in one of its longest dimensions. It may pass into the plate in any other way by means of which it has a large area of contact between the copper and the lead, thereby giving a large collecting surface for the copper conductors from the lead portions of the plate.

The top view, Fig. 2, shows how the bus bars $C^1$ and $C^3$ are connected to the distributers $C^2$ and $C^4$ and how $C^1$ and $C^3$ are alternated with each other so as to furnish paths for the current of more or less equal resistance from the distributers of one set of plates to the distributers of the other set of plates.

In operating my method I throw the switch S so that it engages contact points $S^3$ and $S^4$ thus throwing the shunt field coils and the automatic resistance varying device into operative relation with the charging machine armature to vary the amperage delivery of the charging machine. The automatic resistance varying device varies the resistance in the shunt field coil circuit periodically, causing the charging machine to deliver the current described for the periods stated, and then the amperage is dropped down by degrees to the reversal until the gases have substantially disappeared, and then the amperage is again raised to a heavy charge. This process continues steadily until the battery has been charged, when it is disconnected from the circuit.

In my apparatus if an empty storage battery is suddenly connected to the charging circuit it is possible that the generator may develop too great an amperage for the battery. In this case it is desirable to introduce a regulator to prevent an over heavy charging current. For this purpose I have introduced in the main conductor 2 a low resistance coil 14 and in shunt with this coil an electro-magnetic switch having a coil 15, and armature 16, and a contact 17.

When an excess of current flows over the main conductor 2 the pull of the coil 15 over-powers the pull of the spring 24, so that the armature 16 opens the circuit at contact 17. This has the effect of introducing the resistances 25 and 26 and as many more as may be desired into the circuit of the shunt field coil $D^1$. This is accomplished when relays attract the armature 27 and open the circuits at contacts 19, thereby opening the short circuits around the aforesaid resistances 25 and 26. Thereupon current flows from the charging machine D over the conductor 20 through the resistance 21, coils 18 and conductor 22 back to the charging machine D. This circuit is bridged across the charging machine and is counted upon to energize the relay coils 18 to attract the armature 27 when the circuit is opened at contact 17. When the current from the charging machine has dropped below the required point the pull of the spring 24 over-powers the coil 15 and closes the circuit at contact 17 causing current to flow from the charging machine through conductor 20, resistance 21, conductor 23, contact 17, relay neutralizing coils $18^a$, conductor 22 and back to the charging machine. These neutralizing coils $18^a$ have the effect of instantly neutralizing the magnetic effect of the coils 18 thereby releasing the armature 27 and closing the circuits at contacts 19, thereby short-circuiting the resistances 25 and 26. When the resistances are short-circuited a greater amount of current flows through the shunt field coil $D^1$ which increases the out-put of the charging machine. When the short-circuits around the resistances 25 and 26 are opened the discharge is absorbed by condensers 28 which are bridged across the contacts. By means of these circuits the output of the charging machine is, when the brush $R^1$ of the automatic resistance varying device R rests upon the contact $R^2$, maintained at a steady point. When the brush $R^1$ travels over contacts $R^5$, $R^4$ and $R^3$, or at least when the out-put of the charging machine is reduced below the maximum point, the regulator has no influence upon the operation of my apparatus. The various resistances and shunts are adjusted in accordance with ordinary engineering skill to secure these results.

In place of the resistances 25 and 26 any other resistances may be substituted, as long as these resistance influence the current flowing through the shunt field coil $D^1$. It is quite possible to use a single resistance 25 or as many resistances as the construction of the apparatus and the output of the charging machine may require for efficient operation.

Many variations of my apparatus may be employed. It is not essential that the automatic resistance varying device R and resistance $R^6$ be in series with the shunt field coils $D^1$, for they may be placed anywhere in any circuit which will vary the amperage of the current delivery from the charging machine to the battery being charged. Any other suitable device for varying the current may be employed in place of the automatic resistance varying device R, and any other suitable way may be used to vary the periodicity of the charge. Many other variations may be made in my apparatus without departing from the spirit of my invention.

I claim—

1. In combination, a storage battery, a charging machine providing a source of heavy charging current, an automatic resistance varying device, means to connect said source to charge said storage battery, means to disconnect said battery from said charging current and connect it to a discharging circuit, means switched into circuit to protect from injury the windings of the circuits, and means operated by said automatic resistance to reconnect said battery to the charging current and disconnect it from the discharging circuit.

2. In combination, a storage battery, a charging machine providing a source of heavy charging current an automatic resistance varying device, means to connect said source to charge said storage battery, means to disconnect said battery from said charging current and connect it to a discharging circuit, means switched into circuit to protect from injury the windings of the circuits, and means operated by said automatic resistance to reconnect said battery to the charging current and disconnect it from the discharging circuit and switch said protective means out of circuit.

3. In combination, a storage battery, a charging machine providing a source of heavy charging current, time controlled means for progressively charging the battery by causing the delivery of the heavy current to the battery in a series of arbitrarily fixed periods of efficient charging and for providing intervals of reversal to cause the removal of the obstacles to charging.

4. In combination, a storage battery, a charging machine providing a source of heavy charging current, time controlled means for progressively charging the battery by causing the delivery of the heavy current to the battery in a series of arbitrarily fixed periods of efficient charging and for providing intervals of reversal to cause the removal of the obstacles to charging, said means consisting of an automatic resistance varying device.

5. In combination, a storage battery, a charging machine providing a source of heavy charging current, time controlled means for progressively charging the battery by causing the delivery of the heavy current to the battery in a series of arbitrarily fixed periods of efficient charging and for providing intervals of reversal to cause the removal of the obstacles to charging, said means consisting of an automatic resistance varying device having changing resistance circuits.

6. In combination, a storage battery, a charging machine having a shunt circuit containing a shunt field coil providing a source of heavy charging current, time controlled means for progressively charging the battery by causing the delivery of the heavy current to the battery in a series of arbitrarily fixed periods of efficient charging and for providing intervals of reversal to cause the removal of the obstacles to charging, said means consisting of an automatic resistance varying device having changing resistance circuits located in the shunt circuit containing the shunt field coil adapted to vary the degree of current applied to said battery at the beginning and end of each period.

7. In combination, a storage battery, a charging machine having a shunt circuit containing a shunt field coil providing a source of heavy charging current, time controlled means for progressively charging the battery by causing the delivery of the heavy current to the battery in a series of arbitrarily fixed periods of efficient charging and for providing intervals of reversal to cause the removal of the obstacles to charging, said means consisting of an automatic resistance varying device having changing resistance circuits located in the shunt circuit containing the shunt field coil in series therewith, adapted to vary the degree of current applied to said battery at the beginning and end of each period.

8. In combination, a storage battery, a charging machine having a shunt circuit containing a shunt field coil providing a source of heavy charging current, time controlled means for progressively charging the battery by causing the delivery of the heavy current to the battery in a series of arbitrarily fixed periods of efficient charging and for providing intervals of reversal to cause the removal of the obstacles to charging, said means consisting of an automatic resistance varying device having changing resistance circuits and having means to automatically switch said changing circuits into the shunt circuit containing the shunt field coil.

9. In combination, a storage battery, a charging machine providing a source of heavy charging current, time controlled means for progressively charging the battery by causing the delivery of the heavy current to the battery in a series of arbitrarily fixed periods of efficient charging and for providing intervals of reversal to cause the removal of the obstacles to charging, said means consisting of an automatic resistance varying device having means to disconnect the battery from the charging circuit at the end of each period and to connect it to a reversing circuit, and at the beginning of each succeeding period to disconnect the battery from the reversing circuit and reconnect it to the charging circuit.

10. In combination, a storage battery, a charging machine having a shunt circuit containing a shunt field coil providing a source of heavy charging current, time controlled means for progressively charging the battery by causing the delivery of the heavy current to the battery in a series of arbitrarily fixed periods of efficient charging and for providing intervals of reversal to cause the removal of the obstacles to charging, said means consisting of an automatic resistance varying device having means to automatically switch said changing circuits into the shunt circuit containing the shunt field coil and having means to disconnect the battery from the charging circuit at the end of each period and to connect it to a reversing circuit, and at the beginning of each succeeding period to disconnect the battery from the reversing circuit and reconnect it to the charging circuit.

11. In combination, a storage battery, a charging machine having a shunt circuit containing a shunt field coil providing a source of heavy charging current, time controlled means for progressively charging the battery by causing the delivery of the heavy current to the battery in a series of arbitrarily fixed periods of efficient charging and for providing intervals of reversal to cause the removal of the obstacles to charging, said means consisting of an automatic resistance varying device having changing resistance circuits located in the shunt circuit containing the shunt field coil adapted to vary the degree of current applied to said battery at the beginning and end of each period and having means to automatically switch said changing circuit into the shunt circuit containing the shunt field coil.

12. In combination, a storage battery, a charging machine having a shunt circuit containing a shunt field coil providing a source of heavy charging current, time controlled means for progressively charging the battery by causing the delivery of the heavy current to the battery in a series of arbitrarily fixed periods of efficient charging and for providing intervals of reversal to cause the removal of obstacles to charging, said means consisting of an automatic resistance varying device having changing resistance circuits located in the shunt circuit containing the shunt field coil adapted to vary the degree of current applied to said battery at the beginning and end of each period and having means to automatically switch said changing circuits into the shunt circuit containing the shunt field coil and having means to disconnect the battery from the charging circuit at the end of each period and to connect it to a reversing circuit, and at the beginning of each succeeding period to disconnect the battery from the reversing circuit and reconnect it to the charging circuit.

13. In combination, a storage battery, a charging machine having a shunt circuit containing a shunt field coil providing a source of heavy charging current, time controlled means for progressively charging the battery by causing the delivery of the heavy current to the battery in a series of arbitrarily fixed periods of efficient charging and for providing intervals of reversal to cause the removal of the obstacles to charging, said means consisting of an automatic resistance varying device having changing resistance circuits located in the shunt circuit containing the shunt field coil in series therewith, adapted to vary the degree of current applied to said battery at the beginning and end of each period and having means to automatically switch said changing circuits into the shunt circuit containing the shunt field coil and having means to disconnect the battery from the charging circuit at the end of each period and to connect it to a reversing circuit, and at the beginning of each succeeding period to disconnect the battery from the reversing circuit and reconnect it to the charging circuit.

Signed at New York in the county of New York and State of New York November A. D. 1911.

DAVID H. WILSON.

Witnesses:
  MYRON F. HILL,
  A. L. TRAVIS.